(12) United States Patent
Büker (10) Patent No.: US 10,994,767 B2
(45) Date of Patent: May 4, 2021

(54) STEERING COLUMN ASSEMBLY (71) Applicant: TRW Automotive GmbH, Alfdorf (DE)

(72) Inventor: Richard Büker, Willich (DE)

(73) Assignee: ZF Automotive Germany GmbH, Alfdorf (DE)

(*) Notice: Subject to any disclaimer, the term of this patent is extended or adjusted under 35 U.S.C. 154(b) by 35 days.

(21) Appl. No.: 16/487,238

(22) PCT Filed: Feb. 15, 2018

(86) PCT No.: PCT/EP2018/053819
§ 371 (c)(1),
(2) Date: Aug. 20, 2019

(87) PCT Pub. No.: WO2018/153773
PCT Pub. Date: Aug. 30, 2018

(65) Prior Publication Data
US 2019/0367073 A1 Dec. 5, 2019

(30) Foreign Application Priority Data
Feb. 23, 2017 (DE) .......................... 102017103753.5

(51) Int. Cl.
*B62D 1/19* (2006.01)
*B62D 1/184* (2006.01)
(52) U.S. Cl.
CPC ............. *B62D 1/195* (2013.01); *B62D 1/184* (2013.01)

(58) Field of Classification Search
None
See application file for complete search history.

(56) References Cited

U.S. PATENT DOCUMENTS

| | | | |
|---|---|---|---|
| 8,474,869 B2 | 7/2013 | Sulser et al. | |
| 9,233,707 B2 | 1/2016 | Domig et al. | |
| 10,315,682 B2* | 6/2019 | Agbor | B62D 1/185 |
| 10,343,707 B2* | 7/2019 | Kreutz | B62D 1/195 |
| 10,532,762 B2* | 1/2020 | Sulser | B62D 1/195 |
| 10,829,144 B2* | 11/2020 | Domig | B62D 1/192 |
| 2016/0368524 A1 | 12/2016 | Tinnin | |
| 2019/0185043 A1* | 6/2019 | Bueker | B62D 1/185 |
| 2020/0039569 A1* | 2/2020 | Schnitzer | B62D 1/184 |

FOREIGN PATENT DOCUMENTS

| | | |
|---|---|---|
| DE | 102015204476 B3 | 5/2016 |
| EP | 2151366 B1 | 4/2013 |

* cited by examiner

*Primary Examiner* — Faye M Fleming
(74) *Attorney, Agent, or Firm* — Robert James Harwood

(57) ABSTRACT

A steering column assembly having a vehicle-fixed mounting element and a sleeve element received in the mounting element, which is mounted displaceably in the axial direction in the mounting element for adjusting the steering column assembly. The steering column assembly further comprises an energy absorption device which can be firmly coupled to the mounting element and is firmly connected to the sleeve element, the energy absorption device being deformed in the event of a vehicle crash in consequence of a longitudinal displacement of the sleeve element, and at the same time absorbing part of the kinetic energy of the sleeve element during the event.

20 Claims, 5 Drawing Sheets

STEERING COLUMN ASSEMBLY

CROSS-REFERENCE TO RELATED APPLICATIONS

This application is a national stage of International Application No. PCT/EP2018/053819, filed Feb. 15, 2018, the disclosure of which is incorporated herein by reference in its entirety, and which claimed priority to German Patent Application Serial No. 102017103753.5, filed Feb. 23, 2017, the full disclosure of which is incorporated herein by reference in entirety.

TECHNICAL FIELD

The invention relates to a steering column assembly for a motor vehicle comprising an energy absorption device.

BACKGROUND

Steering column assemblies for vehicles with an energy absorption device are known. In the event of a vehicle crash the energy absorption device dampens the impact of the driver on the steering wheel. In the process, the steering column is shifted in the axial direction away from the driver into the instrument panel, and energy-absorbing components such as, e.g., rolling straps or rolling tear straps absorb part of the energy through plastic deformation.

Steering column assemblies comprising an energy absorption device are intended in particular for vehicles equipped with an airbag in the steering wheel, which in some countries may be driven without wearing a seat belt. In order to minimize a risk of injury, the energy absorption device needs to absorb a significant part of the forces acting on the driver when the driver hits the steering wheel or the airbag.

SUMMARY

The objective of the invention is to build a steering column assembly comprising an energy absorption device, which is made compact and has an improved energy absorption behavior.

To achieve the objective a steering column assembly for a vehicle, in particular a motor vehicle, is provided, comprising a vehicle-fixed mounting element and a sleeve element which is received within the mounting element and is mounted displaceably in the axial direction in the mounting element for adjusting the steering column assembly. The steering column assembly further comprises an energy absorption device, which can be firmly coupled to the mounting element and is firmly connected with the sleeve element, the energy absorption device being deformed in consequence of a longitudinal displacement of the sleeve element in the event of a vehicle crash and at the same time absorbing part of a kinetic energy of the sleeve element during the event. The energy absorption device comprises a first absorption strap and a second absorption strap, which are designed to deform plastically by a relative movement of the sleeve element in relation to the mounting element during a vehicle crash. The steering column assembly further comprises a coupling device that is designed in a manner that it can deform plastically in case of a first energy absorption requirement of the first absorption strap, while the second absorption strap cannot deform plastically, and in case of a second energy absorption requirement that is more demanding than the first energy absorption requirement, both the first and the second absorption straps can deform plastically.

In accordance with the invention, the term energy absorption requirement is a requirement that is determined by external parameters, for example, by the mass of the driver, whether the driver is wearing a seat belt or not, the current vehicle speed and/or the deceleration during a vehicle crash. In other words, the energy absorption requirement specifies the expected amount of energy that needs to be absorbed during a vehicle crash in order to cushion the driver in the best possible way, By "can deform" is to be understood that the energy absorption device and the coupling device are coupled in a manner that the absorption straps are designed to deform by a relative movement of the sleeve element in relation to the mounting element, in order to absorb at least a portion of the energy of the relative movement. A plastic deformation of the absorption strap, for example, during a vehicle crash with a very large energy, in which the energy absorption device is crushed, is not taken into consideration here. The relative movement of the sleeve element occurs particularly when the driver collides against the steering wheel and/or the airbag in the steering wheel and in that way pushes the steering wheel into the vehicle front. In addition to the first absorption strap that is always available, e.g. for absorbing energy of the relative movement, a second connectible absorption strap is provided, which is activated by a second energy absorption requirement. At the same time the energy absorption device has a plurality of damping stages that can variably absorb a lot of energy of the relative movement. In other words, it can provide variable force lines that counteract the relative movement. In this way, in a situation in which it is expected a hard impact of the driver on the steering wheel or the airbag, for example, if the driver is not wearing a seat belt and has a large mass, the second absorption strap can be activated to receive more energy with the energy absorption device. The coupling of the second absorption strap can be done before starting the journey, but also during the journey. Preferably, the relevant parameters can be checked at defined intervals, for example at a frequency of 100 Hz, and the energy absorption requirement can be adjusted accordingly before or while the vehicle is in motion. Thus, the coupling status of the absorption straps is adapted to the current parameters at all times.

In a preferred embodiment, in case of a first energy absorption requirement, for example in vehicle crashes with a low energy, the first absorption strap is coupled to the mounting element and can be deformed plastically. Simultaneously, the second absorption strap is uncoupled by the coupling device of the mounting element, so that the second absorption strap cannot be plastically deformed. As a result, only the first absorption strap is provided as a damping element in case of a first energy absorption requirement, so that only a portion of the energy can be absorbed, which can be received maximally by the entire energy absorption device through both absorption straps.

In a further preferred embodiment, in case of a more demanding second energy absorption requirement, e.g. in the event of a vehicle crash with a high energy, the first absorption strap and the second absorption strap are coupled to the mounting element, wherein the second absorption strap is coupled via the coupling device to the mounting element, so that both the first and the second absorption straps deform plastically. As a result, both the first and second absorption straps are provided as damping elements for a harder impact. The amount of energy that can be absorbed by the energy absorption device is larger, so that the damping effect is adjusted to the harder impact to protect the driver better.

Preferably, the energy absorption device comprises, in particular, at least one sliding block which, optionally can be firmly coupled to the mounting element, such sliding block being firmly connected to the first absorption strap, in particular wherein the steering column assembly comprises at least one locking element which is designed to lock the sliding block in a first position in the axial direction and to release the sliding block in the axial direction in a second position for axial adjustment of the sleeve element. The steering column assembly can thus be adjusted, particularly to increase the comfort for the driver, who can readjust the steering wheel in the axial direction. With the axial adjustment of the steering wheel after releasing the locking element, the energy absorption device is displaced, in order to subsequently be locked again. The energy absorption device may also comprise a plurality of sliding blocks, in particular with a separate locking element being provided for each sliding block.

The sliding block can be connected to the locking element positively and/or frictionally. This can guarantee a particularly good coupling between the sliding block and the locking element, for example, in that the sliding block has a toothing and the locking element has a corresponding toothing, which ensure a secure latching in the axial direction. In addition, the toothing can be used to adjust the sleeve element and thus adjust the steering wheel of the vehicle in the axial direction by means of an electric actuator.

The second absorption strap can be directly or indirectly coupled with the sliding block particularly by means of the coupling device. In this way, the second absorption strap is available for damping the relative movement of the sleeve element in relation to the mounting element. If the energy absorption device comprises a plurality of sliding blocks, a separate sliding block may be provided for each absorption strap, by means of which the respective absorption strap is coupled to the mounting element, in order to be able to absorb energy.

It is advantageous, in case of a second energy absorption requirement, if the coupling device is coupled with the mounting element to the second absorption strap by means of the first absorption strap, and/or by means of the sliding block. Thus, both absorption straps can absorb energy by plastic deformation, being the force counteracting the relative movement of the sleeve element particularly large.

According to an advantageous embodiment, the coupling device has an actuator that is disposed away from the energy absorption device, in particular in the axial direction. By locating the actuator at a different position in relation to the energy absorption device, the assembly space for the energy absorption device can be kept small.

The coupling device may have a pyrotechnical and/or electric actuator, which is activated during or before a crash. A pyrotechnic actuator is particularly reliable and has a low response time. An electric actuator has the advantage that by means of it, the coupling device can often be adjusted as desired both before and during the journey.

According to a further advantageous embodiment, the first absorption strap is a roll tear strap and/or the second absorption strap is a roll strap. Roll tear straps are not only plastically deformed in the event of a crash, but also they separate at least cross-sectionally while losing their connection with the component to which they are attached, more specifically, to which they are part of, meaning that they may even tear themselves. Therefore, a roll tear strap can absorb comparatively much energy. In a roll strap, a tear is not provided, as a result of which such strap can absorb comparatively less energy. While the first absorption strap can absorb a great quantity of energy, and the second absorption strap can absorb less energy, the first stage can already provide a good damping, then when switching to the second absorption strap in the second stage, a moderate damping effect is added.

Preferably, the first absorption strap has at least one C-profile cross-sectionally, wherein the ends of the C-profile of the sleeve element are attached, and wherein the second absorption strap in the C-profile between the first absorption strap and the sleeve element is received cross-sectionally. Thereby, the first absorption strap is securely attached to the sleeve element and the second absorption strap is arranged to save space within the C-profile in the energy absorption device.

It is advantageous if the first absorption strap is arranged at least cross-sectionally parallel to the second absorption strap, wherein the first and the second absorption straps have a U-shape, and wherein the first absorption strap is arranged at least cross-sectionally between the two legs of the second absorption strap. By locating the two absorption straps into each other, so that in each case one leg of the U is opposite to the other leg of the same absorption strap, then the required space of the energy absorption device is particularly small. Variations of the U-shape are possible in a manner that the legs are not the same length, for example, in a J.

The mounting element can be mechanically coupled to the leg away from the sleeve element within the first absorption strap, and optionally it is couplable to the leg away from the sleeve element within the second absorption strap. Thus, the first absorption strap is always coupled in order to absorb energy, while the second absorption strap can be switched on or off if necessary.

Preferably, a first leg of the second absorption strap is received in the C-profile and the second leg is outside the C-profile. In this way, the first leg is protected in the C-profile and the second leg is free and, for example, is more accessible for coupling.

BRIEF DESCRIPTION OF THE DRAWINGS

Further advantages and features will become apparent from the following description in conjunction with the accompanying drawings. In which:

FIG. 5 shows a second embodiment of a steering column assembly according to the invention.

DETAILED DESCRIPTION

Figure 1:
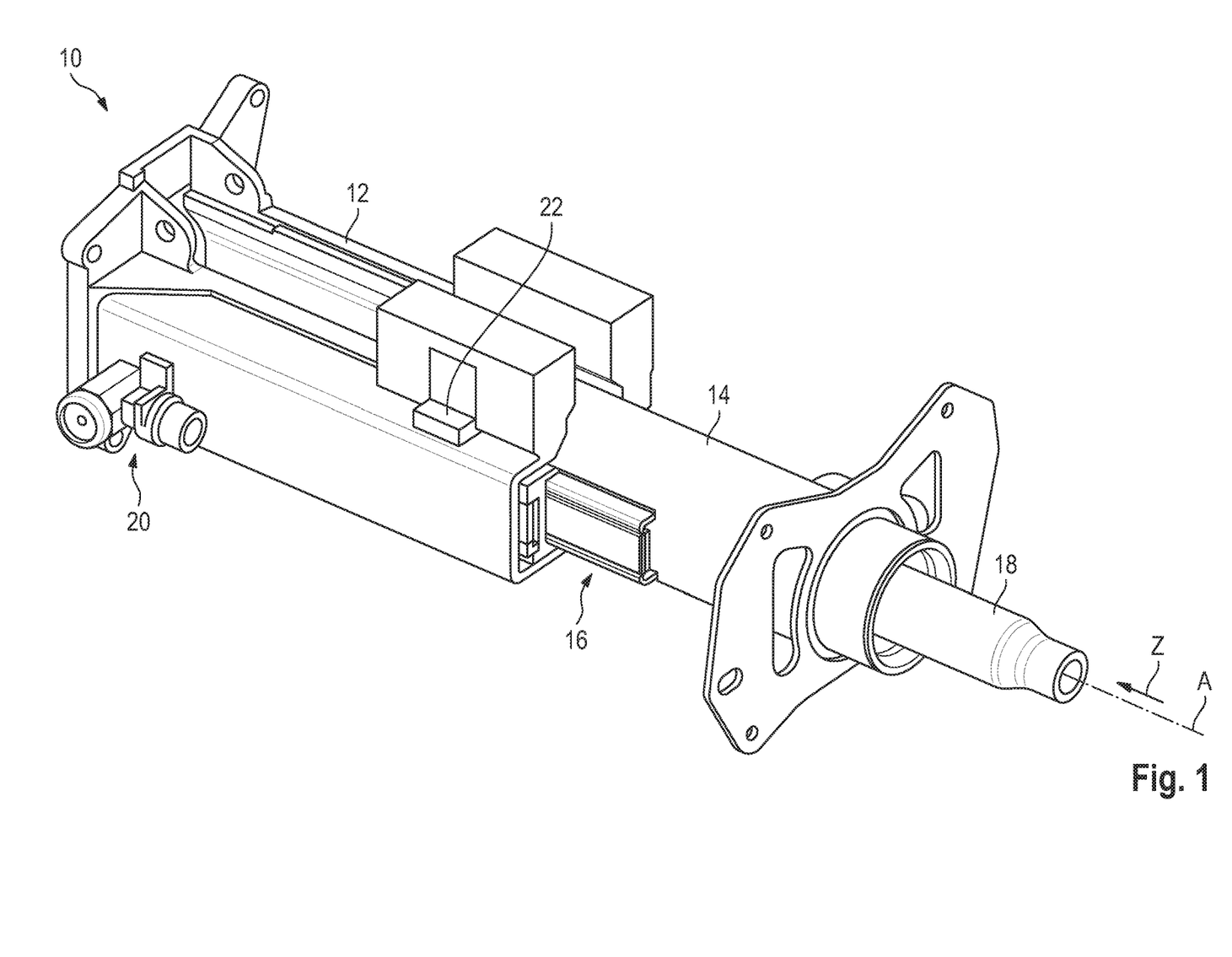
FIG. 1 shows a perspective view of a steering column assembly according to the invention.

FIG. 1 shows a steering column assembly 10 for a vehicle, in particular a motor vehicle such as a passenger car, comprising a mounting element 12, a sleeve element 14 and an energy absorption device 16.

The sleeve element 14 is received in the vehicle-fixed mounting element 12 and mounted so as to be displaceable in the axial direction Z of the sleeve element 14, relative to the mounting element 12. Thus, for example, a steering wheel can be adjusted in the axial direction Z, being such steering wheel arranged opposite to the mounting element 12.

The sleeve element 14 forms a housing for a steering spindle 18, which is mounted in the sleeve element 14 so as to be rotatable about the axis A and is axially adjustable together with it for steering wheel adjustment.

The energy absorbing device 16, viewed by the driver in the embodiment shown at 9 o'clock, is arranged radially outwardly of the sleeve element 14 and is firmly connected to this. The mounting element 12 is firmly connected to the chassis of the motor vehicle by means of a carrier (not illustrated) and thus firmly installed in the vehicle. The mounting element 12 further comprises a coupling device 20, and a locking element 22, which is provided for locking the sleeve element 14 in the axial direction Z. In this way, the sleeve element 14 with an open locking element 22 can be displaced in the mounting element 12 in the axial direction Z, in order to adjust the sleeve element 14 together with the steering spindle 18 and the steering wheel. After the adjustment, the locking element 22 is set to the closed position, which represents the standard position, in which the sleeve element 14 is fixed in place in the axial direction Z in the mounting element 12.

Figure 2:
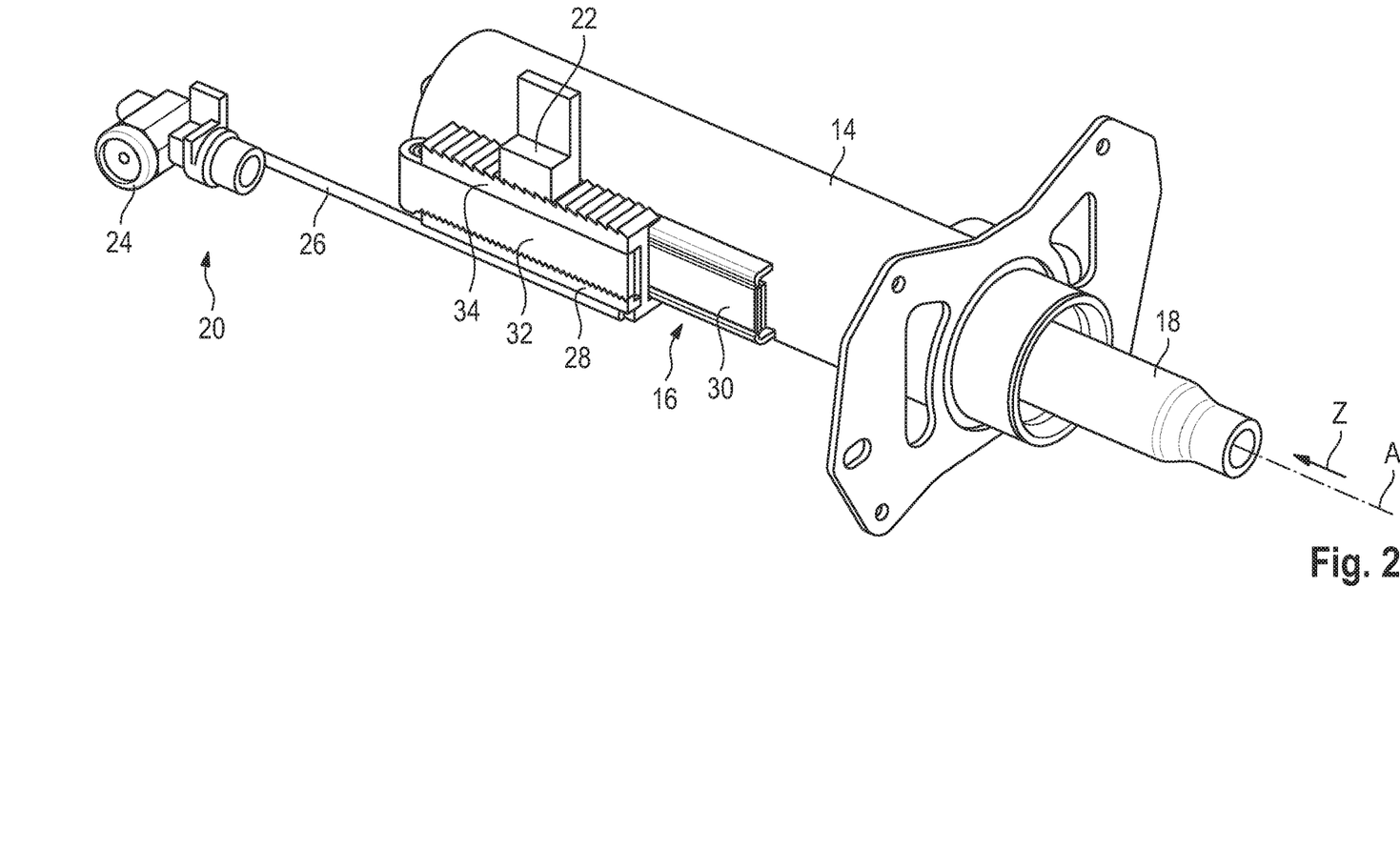
FIG. 2 shows a perspective view of the steering column assembly of FIG. 1 without the mounting element.

The coupling device 20 comprises a pyrotechnic actuator 24, a rod-shaped positioner 26 and a cam rod 28, which is couplable to the energy absorption device 16 (See FIG. 2). Additionally or alternatively, the coupling device 20 may have an electric actuator. The positioner 26 and the cam rod 28 are arranged parallel to the axis A, The pyrotechnic actuator 24 and the cam rod 28 are mounted at opposite ends of the positioner 26, so that the pyrotechnic actuator 24, which is away from the energy absorption device 16 in the axial direction Z, can couple the cam rod 28 with the energy absorption device 16.

Figure 3:
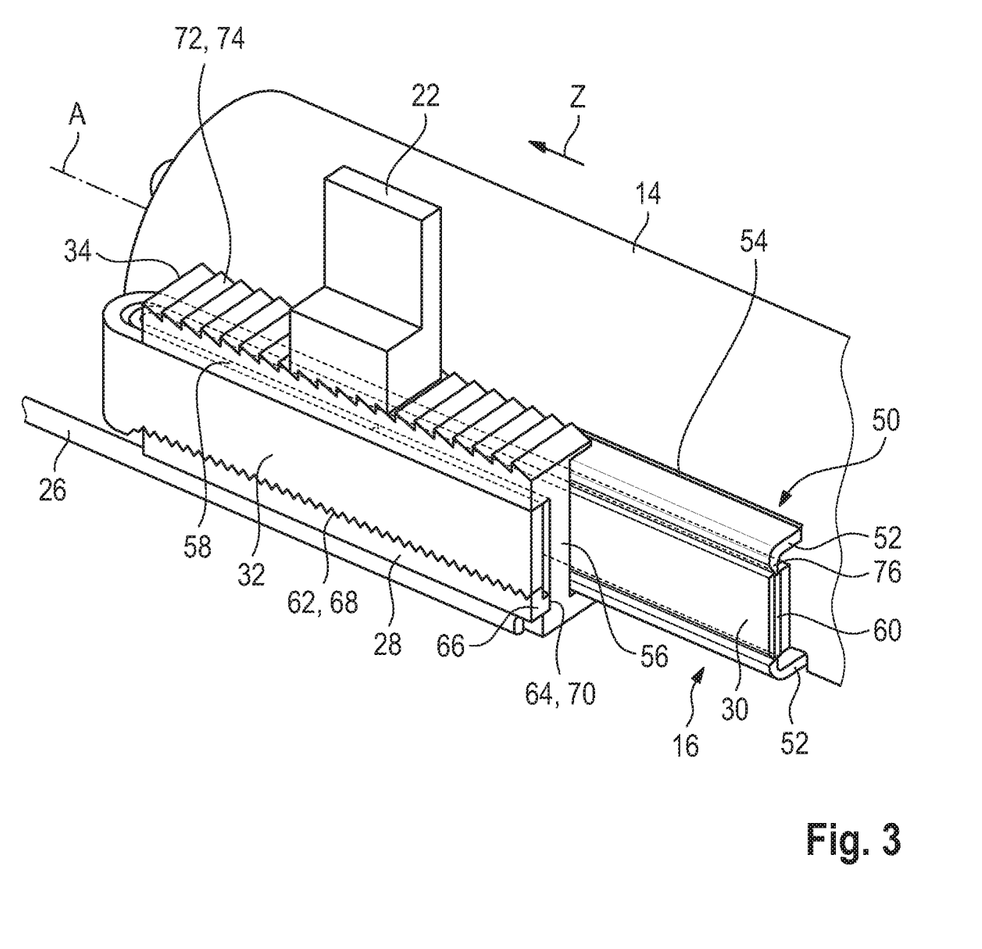
FIG. 3 shows a detailed view of the steering column assembly of FIG. 2.
Figure 4:
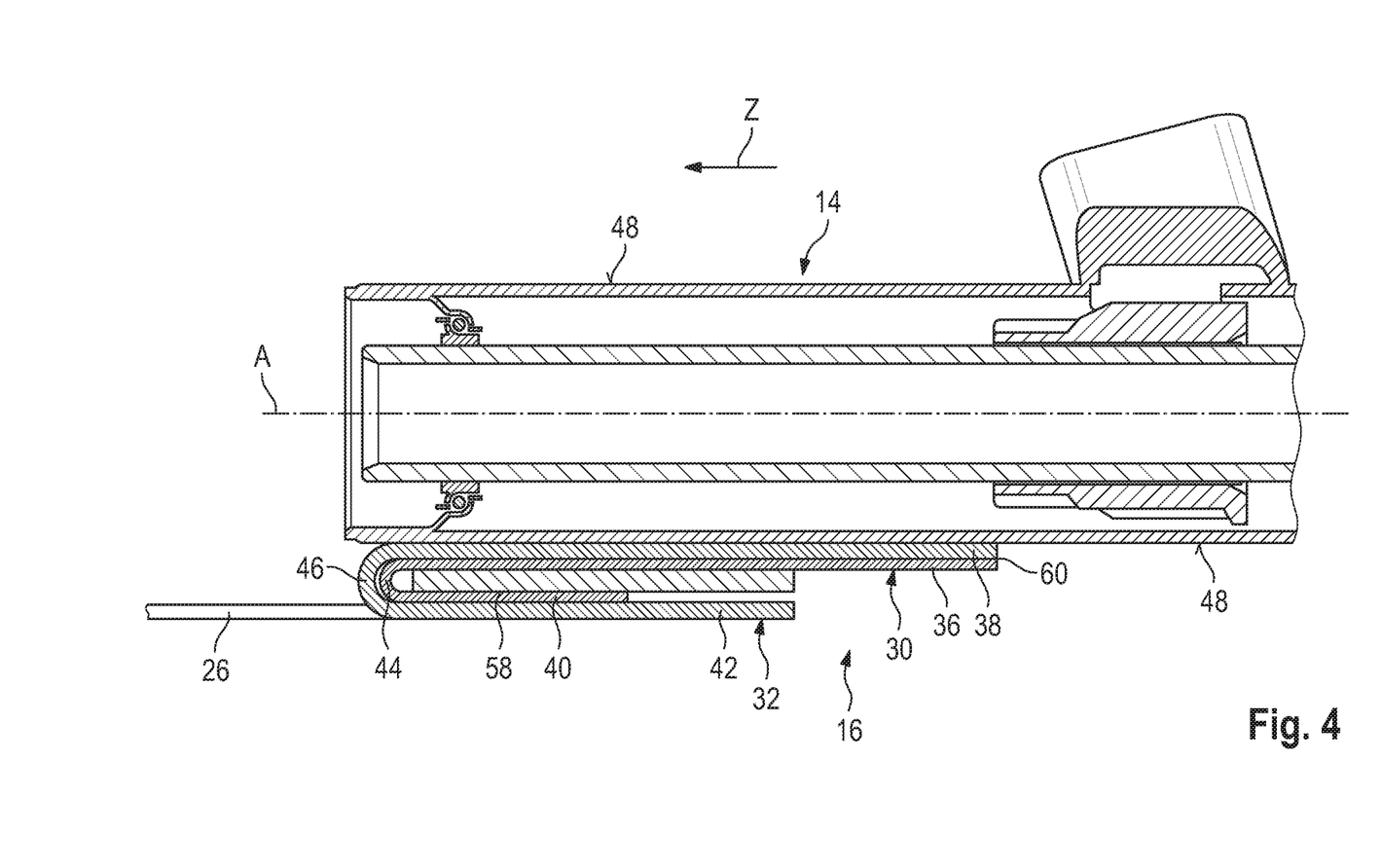
FIG. 4 shows a sectional view of the steering column assembly of FIG. 2, and In a perspective view.

The energy absorption device 16 comprises a first absorption strap 30, which is a roll tear strap, a second absorption strap 32, which is a roll strap, and also a sliding block 34 (see FIG. 3). The first and second absorption straps 30, 32 each essentially have the shape of a band that is bent into a U or J. That is, the first and second absorption straps 30, 32 each have a first leg 36, 38 close to the sleeve element 14, and an opposing second leg 40, 42 away from the sleeve element 14, both being connected to each other by an arc section 44, 46 (see FIG. 4). The first and the second absorption straps 30, 32 extend in the axial direction Z and are essentially positioned parallel to the surface 48 of the sleeve element 14, whereby the first leg 36, 38 is positioned more closely to the sleeve element 14 than the second leg 40, 42.

The first leg 36 of the first absorption strap 30 has a C-profile 50, whose ends 52 are adjacent to the sleeve element 14 (see FIG. 3). By means of the ends 52 of the C-profile 50 the first absorption strap 30 is attached to the sleeve element 14 by a first fixation section 54, in particular in a material-locking manner.

The sliding block 34 is disposed between the first and second legs 36, 40 of the first absorption strap 30. The sliding block 34 has an H-profile 56 and is disposed on the first leg 36 of the first absorption strap 30, in a manner that the sliding block 34 is guided in the axial direction Z on the C-profile 50, such as a sled.

The second leg 40 of the first absorption strap 30 is attached to the sliding block 34 on the side facing away from the sleeve element 14 by a second fixation section 58, in particular in a material-locking manner. The sliding block 34 and the first absorption strap 30 are disposed within the second absorption strap 32, wherein the first leg 38 of the second absorption strap 32 is disposed between the first leg 36 of the first absorption strap 30 and the sleeve element 14.

The first leg 36 of the first absorption strap 30 is connected at its free end with the free end of the first leg 38 of the second absorption strap 32 by means of a connecting section 60. On the second leg 42 of the second absorption strap 32, a first locking contour 62 is provided for coupling with the cam rod 28. The sliding block 34 has a second locking contour 64, which is provided for coupling with the cam rod 28.

The cam rod 28 has an L-profile 66 and extends in the axial direction Z. At both ends of the L the cam rod 28 has a locking contour 68, 70 complementary to the first and second locking contour 62, 64. The positioner 26 and the cam rod 28 are arranged in such a manner in relation to the second leg 42 of the second absorption strap 32 and the sliding block 34, so that the second leg 42 of the second absorption strap 32 is coupled to the sliding block 34 when the cam rod 28 is moved to a position in which said cam rod 28 by means of the locking contours 62, 64, 68, 70 is locked in place in the axial direction Z together with the second leg 42 of the second absorption strap 32 and the sliding block 34.

Due to the axial alignment of the cam rod 28 and the second leg 42 and the locking contours 62, 68, the axial displacement is compensated, which occurs when adjusting the sleeve element 14. This is particularly achievable in all possible positions of the sleeve element 14 in order to couple the second absorption strap 32 to the mounting element 12, so that the second absorption strap 32 can absorb energy in the event of a crash. The coupling occurs when the pyrotechnic actuator 24 is activated by the energy absorption requirements in a crash event and the positioner 26 rotates for example by 90° about its axis, so that the second absorption strap 32 is coupled to or uncoupled from the sliding block 34 by means of the cam rod 28.

Alternatively, in particular when the coupling device 20 comprises an actuator, such as an electric actuator that allows multiple coupling and decoupling actions, said actions can be executed taking into account the current energy absorption requirement prior to a crash, wherein a control system considers, for example, one of or the following parameters: speed, passenger weight, seat belt fastening, seat position. In this manner, the second absorption strap 32 is couplable to the sliding block 34 while the cam rod 28 is rotated into a position in which said cam rod 28 engages into the locking contour 62 of the second absorption strap 32 and into the locking contour 64 of the sliding block 34.

Alternatively or additionally, the second leg 42 of the second absorption strap 32 can be coupled to and uncoupled from the sliding block 34 by means of the cam rod 28 via the second leg 40 of the first absorption strap 30. In this case, the second leg 40 of the first absorption strap 30 has a corresponding locking contour, which can engage with the cam rod 28 in the axial direction Z.

The sliding block 34 has a toothing 74 on the outer side 72 opposite to the locking element 22, said toothing 74 extending in the axial direction Z and with which the locking element 22 can engage. In this way, the locking element 22 can lock at different positions in the axial direction Z with the toothing 74 and thus fix the sleeve element 14 in the axial direction Z in closed position by means of the energy absorption device 16.

In an alternative embodiment, the toothing 74 can also or alternatively be used to adjust axially the sleeve element 14 by means of, for example, an electric actuator, as previously mentioned. If an electric actuator for axial adjustment of the sleeve element 14 is provided, said actuator can be used to lock the sleeve element 14. In this way, a separate locking element 22 can be omitted, more specifically, in case that the locking element 22 is formed by a component of the actuator, for example, by the actuator spindle.

In a further alternative embodiment, by means of the toothing 74 a frictional connection of the locking element 22 and the sliding block 34 may be provided instead or in addition to the positive-lock connection. When the sleeve element 14 displaces in the Z direction during a vehicle crash, a relative movement of the sleeve element 14 in relation to the sliding block 34 occurs, which results in deformation of the absorption straps 30, 32 coupled to the sliding block 34, and thus said straps absorb energy. Depending on whether the second absorption strap 32 is coupled to the sliding block 34 or not, the energy absorption device 16 can absorb two different amounts of energy, whilst providing two different resistances that counteract the relative movement of the sleeve element 14.

According to a preferred embodiment, the second absorption strap 32 is not coupled to the sliding block 34 by default, and it will be only switched on if determined by the present energy absorption requirement. In an alternative embodiment, the first and second absorption straps 30, 32 may be coupled by default, wherein the second absorption strap 32 is uncoupled if determined by the present energy absorption requirement. In case of a first energy absorption requirement, wherein the expected amount of energy that must be absorbed by the energy absorption device during a vehicle crash is below a threshold value, only the first absorption strap 30 is coupled to the sliding block 34. If, in this case the sleeve element 14 is displaced in the axial direction Z, then the sliding block 34 moves against the axial direction Z along the sleeve element 14 and pulls along the second leg 40 attached to said sleeve element 14 within the first absorption strap 30. As a result, the first absorption strap 30 is plastically deformed and separates from its first leg 36 of the sleeve element 14, or is torn, for example, between the ends 52 and the connecting web 76. The second absorption strap 32 in this case is not damaged, so that essentially there is no deformation of the second absorption strap 32.

In case of a second energy absorption requirement, wherein the expected amount of energy that must be absorbed during a vehicle crash by the energy absorption device is above a threshold value, the second absorption strap 32 is connected by means of the coupling device 20, so that the first and second absorption straps 30, 32 are coupled to the sliding block 34. If, in this case the sleeve element 14 is displaced in the axial direction Z, then the sliding block 34 moves against the axial direction Z along the sleeve element 14 and pulls along both the second leg 40 attached to said sleeve element 14 within the first absorption strap 30 and the second leg 42 coupled to said sliding block 34 within the second absorption strap 32. Thus, the first absorption strap 30 is plastically deformed and separates at its first leg 36 from the sleeve element 14, while the second absorption strap 32 in this case is only plastically deformed.

In an alternative embodiment, both the first and the second absorption straps 30, 32 may be designed as a roll tear strap, in order to increase the maximum energy which can be absorbed by the energy absorption device 16. In a further alternative embodiment, both the first and the second absorption straps 30, 32 may be designed as a roll strap. In addition, the first absorption strap 30 may be a roll strap and the second absorption strap 32 may be a roll tear strap.

Figure 5:
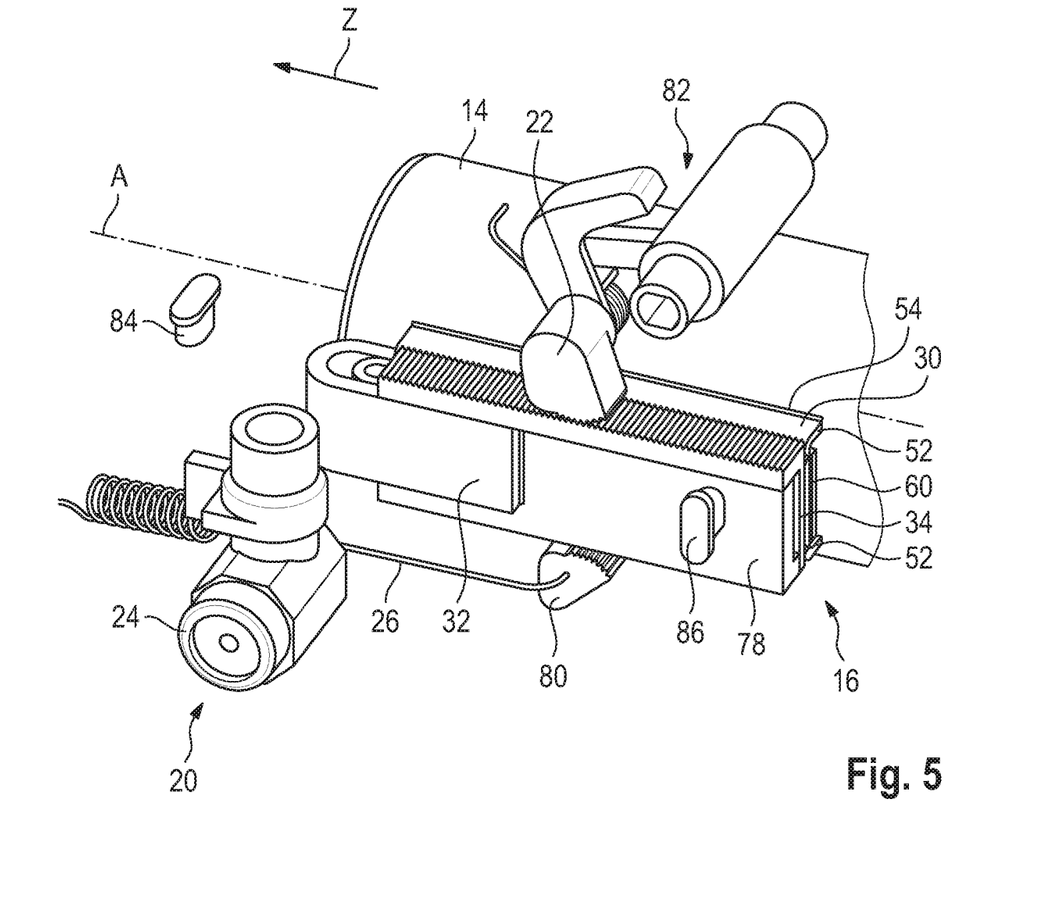

In this way, a steering column assembly 10 is assembled with a two-stage energy absorption device 16, which is particularly compact. In FIG. 5, a second embodiment of the steering column assembly 10 (without the mounting element 12) is shown, which is designed essentially identical to the first column assembly 10, except for the following characteristics. For the same structures with the same functions, corresponding reference numerals are assigned below.

In this embodiment, the energy absorption device 16 comprises a second sliding block 78 which is arranged parallel to the first sliding block 34. The first and second sliding block 34, 78 have an L-profile and are positioned next to each other in a manner that they form a closed ring. The first sliding block 34 is firmly connected to the second leg 40 of the first absorption strap 30, in a manner that the first absorption strap 30 can be deformed plastically by a relative movement of the first sliding block 56 in relation to the sleeve element 14. The second sliding block 78 is firmly connected to the second leg 42 of the second absorption strap 32, in a manner that the second absorption strap 32 can be deformed plastically by a relative movement of the second sliding block 78 in relation to the sleeve element 14.

In this embodiment the coupling device 20 comprises, instead of the cam rod 28, a second locking element 80, which is provided for locking the second sliding block 78. Thus, the second sliding block 78 can be firmly coupled to the mounting element 12 in the axial direction Z, as a result of which, if the sleeve element 14 is displaced in the axial direction Z, a relative movement takes place. The locking element 22 can be coupled to the first sliding block 34 by means of a second positioner 82. The locking element 22 is provided as in the first embodiment for locking the first sliding block 34. Thus, the first sliding block 34 can be firmly coupled to the mounting element 12 in the axial direction Z, as a result of which, if the sleeve element 14 is displaced in the axial direction Z, a relative movement takes place. Furthermore, two stops 84, 86 arranged oppositely in the axial direction Z are provided, which prevent that the energy absorption device 16 can be displaced in the axial direction Z beyond the position of the axial stops 84, 86.

In dependence upon the energy absorption requirement, one of the two absorption straps 30, 32 or both absorption straps 30, 32 can be coupled to the mounting element 12 in order to be able to absorb an amount of energy matching the energy absorption requirement. In the case that the first and second absorption straps 30, 32 can absorb a different amount of energy, then a steering column assembly 10 may be provided with an adaptive three-stage energy absorption device 16.

The invention is not limited to the embodiments shown. In particular, individual features of one embodiment; independent from the other characteristics of the corresponding embodiment, may be included in a further embodiment according to the invention. In other words, the described features are combinable in any manner.

The invention claimed is:

1. A steering column assembly for a vehicle, comprising:
   a vehicle-fixed mounting element and a sleeve element received within the mounting element, the sleeve element being mounted displaceably in an axial direction in the mounting element for adjusting the steering column assembly, and
   an energy absorption device which is firmly coupled to the mounting element and is firmly connected with the sleeve element, the energy absorption device being deformed in the event of a vehicle crash as in consequence of a longitudinal displacement of the sleeve element, and at the same time absorbing some of the kinetic energy of the sleeve element during the event, wherein energy absorption device comprises a first absorption strap and a second absorption strap, the first absorption strap having a first leg directly connected to the sleeve element and a second leg couplable to the mounting element, the second absorption strap having a first leg coupled to the sleeve element and a second leg couplable to the mounting element, the first and second absorption straps being designed to plastically deform during a vehicle crash by relative movement of the sleeve element in relation to the mounting element; and wherein the steering column assembly comprises a coupling device that is designed so that during a vehicle crash having a first energy absorption requirement, the first absorption strap plastically deforms while the second absorption strap does not deform plastically, and during a vehicle crash having a second energy absorption requirement that is more demanding than the first energy absorption requirement, both the first and the second absorption straps plastically deform.

2. The steering column assembly according to claim 1, wherein during the vehicle crash having the first energy absorption requirement, the first absorption strap is coupled with the mounting element and plastically deforms, and the second absorption strap is uncoupled from the mounting element by the coupling device so that the second absorption strap does not plastically deform.

3. The steering column assembly according to claim 1, wherein during the vehicle crash having the second energy absorption requirement, the first absorption strap and the second absorption strap are coupled to the mounting element so that both the first and the second absorption straps plastically deform, the second absorption strap being coupled to the mounting element via the coupling device during the vehicle crash having the second energy absorption requirement.

4. The steering column assembly according to claim 1, wherein the energy absorption device comprises at least one sliding block which optionally can be firmly coupled to the mounting element, such sliding block firmly connected to the first absorption strap, wherein the steering column assembly comprises at least one locking element which is designed to lock the sliding block in a first position in the axial direction and to release the sliding block in the axial direction in a second position for axial adjustment of the sleeve element.

5. The steering column assembly according to claim 4, wherein the sliding block can be connected to the locking element positively and/or frictionally.

6. The steering column assembly according to claim 4, wherein the second absorption strap can be coupled directly or indirectly with the sliding block by means of the coupling device.

7. The steering column assembly according to claim 6, wherein the coupling device in case of a second energy absorption requirement is coupled with the mounting element to the second absorption strap by means of the first absorption strap, and/or by means of the sliding block.

8. The steering column assembly according to claim 1, wherein the coupling device has an actuator that is disposed away from the energy absorption device in the axial direction.

9. The steering column assembly according to claim 1, wherein the coupling device has a pyrotechnic and/or electric actuator that is activated during or before the event of a crash.

10. The steering column assembly according to claim 1, wherein the first absorption strap is a roll tear strap and/or the second absorption strap is a roll strap.

11. The steering column assembly according to claim 1, wherein the first leg of the first absorption strap has at least one C-profile cross-sectionally, ends of the C-profile being directly connected to the sleeve element the second absorption strap being received cross-sectionally in the C-profile between the first absorption strap and the sleeve element.

12. The steering column assembly according to claim 11, wherein the first absorption strap is arranged at least cross-sectionally parallel to the second absorption strap, wherein the first and the second absorption straps have a U-shape, and wherein the first absorption strap is arranged at least cross-sectionally between the two legs of the second absorption strap.

13. The steering column assembly according to claim 12, wherein the mounting element is mechanically couplable to the second leg of the first absorption strap away from the sleeve element, and couplable to the second leg of the second absorption strap away from the sleeve element.

14. The steering column assembly according to claim 13, wherein the first leg of the second absorption strap is received in the C-profile and the second leg of the second absorption strap remains outside the C-profile.

15. The steering column assembly according to claim 1, wherein the first leg of the first absorption strap is directly connected to a cylindrical outer surface of the sleeve element.

16. The steering column assembly according to claim 1, wherein the first leg of the second absorption strap is directly connected to the first leg of the first absorption strap, the first leg of the second absorption strap being coupled to the sleeve element through the first absorption strap.

17. A steering column assembly for a vehicle, comprising:
a vehicle-fixed mounting element;
a sleeve element received in the mounting element, the sleeve element being displaceable in an axial direction relative to the mounting element for adjusting the steering column assembly;
a U-shaped first absorption strap having a first leg coupled to the sleeve element and a second leg couplable to the mounting element; and
a U-shaped second absorption strap having a first leg coupled to the sleeve element and a second leg couplable to the mounting element, at least a portion of the first absorption strap being nested between the first and second legs of the second absorption strap;
during a vehicle crash having a first energy absorption requirement, the first absorption strap being coupled to the mounting element and plastically deforming as the steering element moves in the axial direction relative to the mounting element, while the second absorption strap is uncoupled from the mounting element and does not plastically deform as the steering element moves in the axial direction relative to the mounting element;
during a vehicle crash having a second energy absorption requirement that is greater than the first energy absorption requirement, the first and second absorption straps being coupled to the mounting element and plastically deforming as the steering element moves in the axial direction relative to the mounting element.

18. The steering column assembly according to claim 17, further comprising a coupling device for coupling and uncoupling the second absorption strap to and from the mounting element.

19. The steering column assembly according to claim 18, further comprising a sliding block couplable to the mounting element, the second leg of the first absorption strap being directly connected to the sliding block and couplable to the mounting element through the sliding block, the second leg of the second absorption strap being couplable to the sliding block by the coupling device, the second leg of the second absorption strap being couplable to the mounting element through the sliding block.

20. The steering column assembly according to claim 17, wherein the first leg of the second absorption strap is directly connected to the first leg of the first absorption strap, the first leg of the second absorption strap being coupled to the sleeve element through the first absorption strap.

* * * * *